(12) United States Patent
Mahlmeister et al.

(10) Patent No.: US 11,273,368 B2
(45) Date of Patent: Mar. 15, 2022

(54) CUSTOMIZABLE RUMBLE EFFECT IN GAMING ACCESSORY

(71) Applicant: STEELSERIES ApS, Frederiksberg (DK)

(72) Inventors: Jeffrey Nicholas Mahlmeister, Glenview, IL (US); Tino Soelberg, Chicago, IL (US); Dave Astels, Chicago, IL (US); David Michael Tibbetts, Schaumburg, IL (US)

(73) Assignee: STEELSERIES ApS, Frederiksberg (DK)

( * ) Notice: Subject to any disclaimer, the term of this patent is extended or adjusted under 35 U.S.C. 154(b) by 0 days.

(21) Appl. No.: 17/115,033

(22) Filed: Dec. 8, 2020

(65) Prior Publication Data

US 2021/0113917 A1    Apr. 22, 2021

Related U.S. Application Data

(63) Continuation of application No. 16/751,315, filed on Jan. 24, 2020, now Pat. No. 10,888,774, which is a
(Continued)

(51) Int. Cl.
*A63F 13/20*        (2014.01)
*A63F 13/24*        (2014.01)
(Continued)

(52) U.S. Cl.
CPC .............. *A63F 13/22* (2014.09); *A63F 13/24* (2014.09); *A63F 13/285* (2014.09); *A63F 13/42* (2014.09);
(Continued)

(58) Field of Classification Search
CPC ........ A63F 13/22; A63F 13/24; A63F 13/285; A63F 13/42; G06F 3/016; G06F 3/023; G06F 3/03543; G06F 3/038; G06F 3/0395
See application file for complete search history.

(56) References Cited

U.S. PATENT DOCUMENTS 4,303,856 A    12/1981    Serras-paulet
6,071,194 A    6/2000    Sanderson
(Continued)

OTHER PUBLICATIONS

"Keyboard Technology," http://en.wikipedia.org/widi/Keyboard_technology#Membrane_keyboard, 7 pgs. 2014.
(Continued)

*Primary Examiner* — David L Lewis
*Assistant Examiner* — Shauna-Kay Hall
(74) *Attorney, Agent, or Firm* — Guntin & Gust, PLC; Kenneth Kwan

(57) ABSTRACT

A device for online gaming includes a memory that stores instructions. A processor coupled to the memory, responsive to executing the instructions, performs operations including receiving a selection of a gaming accessory, receiving a selection of a game, and receiving inputs corresponding to selections of parameters for generating a vibration effect at the gaming accessory. The parameters include a control component of the gaming accessory, a game event associated with the control component, a vibration frequency of the vibration effect associated with the game event, a vibration intensity and duration, and a delay time associated with the event. The processor stores the selected parameters and presents the vibration effect during the game in accordance with occurrence of the game event and in accordance with the selected parameters; the vibration effect is presented after the occurrence of the game event in accordance with the delay time.

20 Claims, 13 Drawing Sheets

Related U.S. Application Data continuation of application No. 16/118,628, filed on Aug. 31, 2018, now Pat. No. 10,576,368, which is a continuation of application No. 14/685,695, filed on Apr. 14, 2015, now Pat. No. 10,086,272.

(60) Provisional application No. 61/982,081, filed on Apr. 21, 2014.

(51) Int. Cl.

| | | |
|---|---|---|
| *A63F 13/22* | (2014.01) | |
| *A63F 13/285* | (2014.01) | |
| *G06F 3/01* | (2006.01) | |
| *G06F 3/038* | (2013.01) | |
| *A63F 13/42* | (2014.01) | |
| *G06F 1/16* | (2006.01) | |
| *G06F 3/023* | (2006.01) | |
| *G06F 3/0354* | (2013.01) | |
| *G06F 3/039* | (2013.01) | |
| *G06F 9/445* | (2018.01) | |
| *G06F 13/10* | (2006.01) | |
| *H01F 7/02* | (2006.01) | |
| *A63F 13/60* | (2014.01) | |
| *A63F 13/63* | (2014.01) | |

(52) U.S. Cl.
CPC ............ *G06F 1/1652* (2013.01); *G06F 3/016* (2013.01); *G06F 3/023* (2013.01); *G06F 3/038* (2013.01); *G06F 3/0395* (2013.01); *G06F 3/03543* (2013.01); *G06F 9/44505* (2013.01); *G06F 13/102* (2013.01); *H01F 7/0273* (2013.01); *A63F 13/60* (2014.09); *A63F 13/63* (2014.09); *A63F 2300/1018* (2013.01); *A63F 2300/208* (2013.01); *G06F 2203/013* (2013.01)

(56) References Cited

U.S. PATENT DOCUMENTS

| | | |
|---|---|---|
| 6,468,158 B1 | 10/2002 | Ootori et al. |
| 7,131,073 B2 | 10/2006 | Rosenberg et al. |
| 7,925,797 B2 | 4/2011 | Wolff-Petersen |
| 8,108,566 B2 | 1/2012 | Petersen |
| 8,272,956 B2 | 9/2012 | Kelly et al. |
| 8,281,046 B2 | 10/2012 | Wolff-Petersen |
| 8,341,305 B2 | 12/2012 | Wolff-Petersen |
| 8,577,049 B2 | 11/2013 | Guntin et al. |
| 8,700,829 B2 | 4/2014 | Casparian et al. |
| 8,956,234 B2 | 2/2015 | Wolff-Petersen et al. |
| 9,364,750 B2 | 6/2016 | Wolff-Petersen et al. |
| 9,579,048 B2 | 2/2017 | Rayner et al. |
| 9,975,043 B2 | 5/2018 | Mahlmeister et al. |
| 2002/0022496 A1 | 2/2002 | Park et al. |
| 2002/0163498 A1 | 11/2002 | Chang et al. |
| 2003/0236878 A1 | 12/2003 | Egi |
| 2004/0204242 A1 | 10/2004 | Cheng et al. |
| 2005/0085298 A1 | 4/2005 | Woolston et al. |
| 2006/0030407 A1 | 2/2006 | Thayer |
| 2006/0084504 A1 | 4/2006 | Chan |
| 2006/0097453 A1 | 5/2006 | Feldman et al. |
| 2006/0119586 A1 | 6/2006 | Grant et al. |
| 2006/0256075 A1 | 11/2006 | Anastas et al. |
| 2007/0198216 A1 | 8/2007 | Aguilar et al. |
| 2008/0018592 A1 | 1/2008 | Park |
| 2008/0188277 A1 | 8/2008 | Ritter et al. |
| 2008/0266250 A1 | 10/2008 | Jacob |
| 2008/0268943 A1 | 10/2008 | Jacob |
| 2008/0318687 A1 | 12/2008 | Backer et al. |
| 2009/0075687 A1 | 3/2009 | Hino et al. |
| 2009/0227368 A1 | 9/2009 | Wyatt |
| 2009/0258700 A1 | 10/2009 | Bright et al. |
| 2010/0090952 A1 | 4/2010 | Zhang et al. |
| 2010/0227682 A1 | 9/2010 | Reville et al. |
| 2010/0250794 A1 | 9/2010 | Hanks et al. |
| 2010/0265176 A1 | 10/2010 | Olsson et al. |
| 2010/0302199 A1 | 12/2010 | Taylor et al. |
| 2011/0009192 A1 | 1/2011 | Aronzon et al. |
| 2011/0021143 A1 | 1/2011 | Kapur et al. |
| 2011/0021269 A1 | 1/2011 | Wolff-Petersen et al. |
| 2011/0065503 A1 | 3/2011 | Wolff-Petersen et al. |
| 2011/0086712 A1 | 4/2011 | Cargill |
| 2011/0113485 A1 | 5/2011 | Little et al. |
| 2011/0244961 A1 | 10/2011 | Soelberg et al. |
| 2012/0068939 A1 | 3/2012 | Pemberton-Pigott et al. |
| 2012/0083209 A1 | 4/2012 | Giles et al. |
| 2012/0122587 A1 | 5/2012 | Kelly et al. |
| 2012/0165099 A1 | 6/2012 | Ito et al. |
| 2012/0264516 A1 | 10/2012 | Rudchenko et al. |
| 2012/0311458 A1 | 12/2012 | Wolff-Petersen et al. |
| 2012/0315983 A1 | 12/2012 | Miller, IV et al. |
| 2013/0079154 A1 | 3/2013 | Wolff-Petersen |
| 2013/0288759 A1 | 10/2013 | Rom et al. |
| 2015/0039407 A1 | 2/2015 | Liu |
| 2016/0001175 A1 | 1/2016 | Aronzon et al. |
| 2016/0048507 A1 | 2/2016 | Aronzon |
| 2016/0263480 A1 | 9/2016 | Wolff-Petersen et al. |
| 2016/0279512 A1 | 9/2016 | Wolff-Petersen et al. |
| 2017/0028296 A1 | 2/2017 | Wolff-Petersen et al. |
| 2017/0282058 A1 | 10/2017 | Mahlmeister et al. |
| 2017/0282059 A1 | 10/2017 | Mahlmeister |
| 2017/0306662 A1 | 10/2017 | Och et al. |
| 2018/0178115 A1 | 6/2018 | Mahlmeister et al. |
| 2018/0221760 A1 | 8/2018 | Soelberg |
| 2018/0236353 A1 | 8/2018 | Mahlmeister et al. |
| 2018/0369690 A1 | 12/2018 | Mahlmeister et al. |
| 2019/0134497 A1 | 5/2019 | Mahlmeister et al. |
| 2019/0143203 A1 | 5/2019 | Mahlmeister |
| 2019/0192963 A1 | 6/2019 | Soelberg |
| 2020/0114255 A1 | 4/2020 | Soelberg |
| 2020/0155927 A1 | 5/2020 | Mahlmeister et al. |
| 2021/0001212 A1 | 1/2021 | Mahlmeister et al. |
| 2021/0113918 A1 | 4/2021 | Soelberg |

OTHER PUBLICATIONS

"WoW Basic Weak Auras Tutorial—Cooldown Icons and Buffs" published on YouTube by Wonton on Mar. 15, 2014, available and printed from URL <https://www.youtube.com/watch?v=jZ5gErd9dhl>, Mar. 15, 2014, 9 pages.
http://us.battle.net/en/, 2 pgs. (2011).
http://www.esl.eu/, 2 pgs. (2011).
http://www.hltv.org/, 2 pgs (2011).
"ESL Pro Series", [http://www.esl.eu/benelux/pro-series/season5/, Apr. 26, 2012, 1 page.
"World of Warcraft", [http://us.battle.net/wow/en/community, Apr. 26, 2012, 1 page.
"ZXP 1000 Gaming Keyboard User Guide", Version 2.0, May 2007, pp. 1-15.
Blizzard Entertainment, "World of WarCraft MMO Gaming Mouse User Guide", 2008, pp. 1-12.
Otten, Martin, "Broadcasting Virtual Games in the Internet", Jun. 2001, 11 pages.
PCWORLD, "Mechanical Keyboards: Reviews and FAQs", Apr. 20, 2015, pp. 1-11. . . .

900

1300

CUSTOMIZABLE RUMBLE EFFECT IN GAMING ACCESSORY

CROSS-REFERENCE TO RELATED APPLICATIONS

This application is a continuation of U.S. application Ser. No. 16/751,315, filed on Jan. 24, 2020, which is a continuation of U.S. application Ser. No. 16/118,628 (now U.S. Pat. No. 10,576,368), filed on Aug. 31, 2018, which is a continuation of U.S. application Ser. No. 14/685,695 (now U.S. Pat. No. 10,086,272), filed on Apr. 14, 2015, which claims the benefit of priority to U.S. Provisional Application No. 61/982,081, filed Apr. 21, 2014. The contents of each of the foregoing are hereby incorporated by reference into this application as if set forth herein in full.

FIELD OF THE DISCLOSURE

The present disclosure relates generally to a system and method for managing use of an accessory. More specifically, the present disclosure relates to a system and method for customizing vibration feedback (also called rumble effects) in a gaming accessory.

BACKGROUND OF THE DISCLOSURE

It is common today for gamers to utilize more than one gaming accessory. This is especially true of gamers who play on-line games or competitive games in a team or individual configuration. Gamers can have at their disposal accessories such as a keyboard, a general purpose gaming pad, a mouse, a gaming console controller, a headset to communicate with other players, a joystick, a computer console, or other common gaming accessories.

A gamer can frequently use a combination of these accessories in a single game (e.g., headset, a keyboard, and mouse). Efficient management and utilization of these accessories can frequently impact a gamer's ability to compete.

Accessory management can have utility in other disciplines which may not relate to gaming applications. Efficient use of accessories in these other disciplines can be important to other users.

BRIEF DESCRIPTION OF THE DRAWINGS

Reference will now be made to the accompanying drawings, which are not necessarily drawn to scale, and wherein.

DETAILED DESCRIPTION

Figure 1:
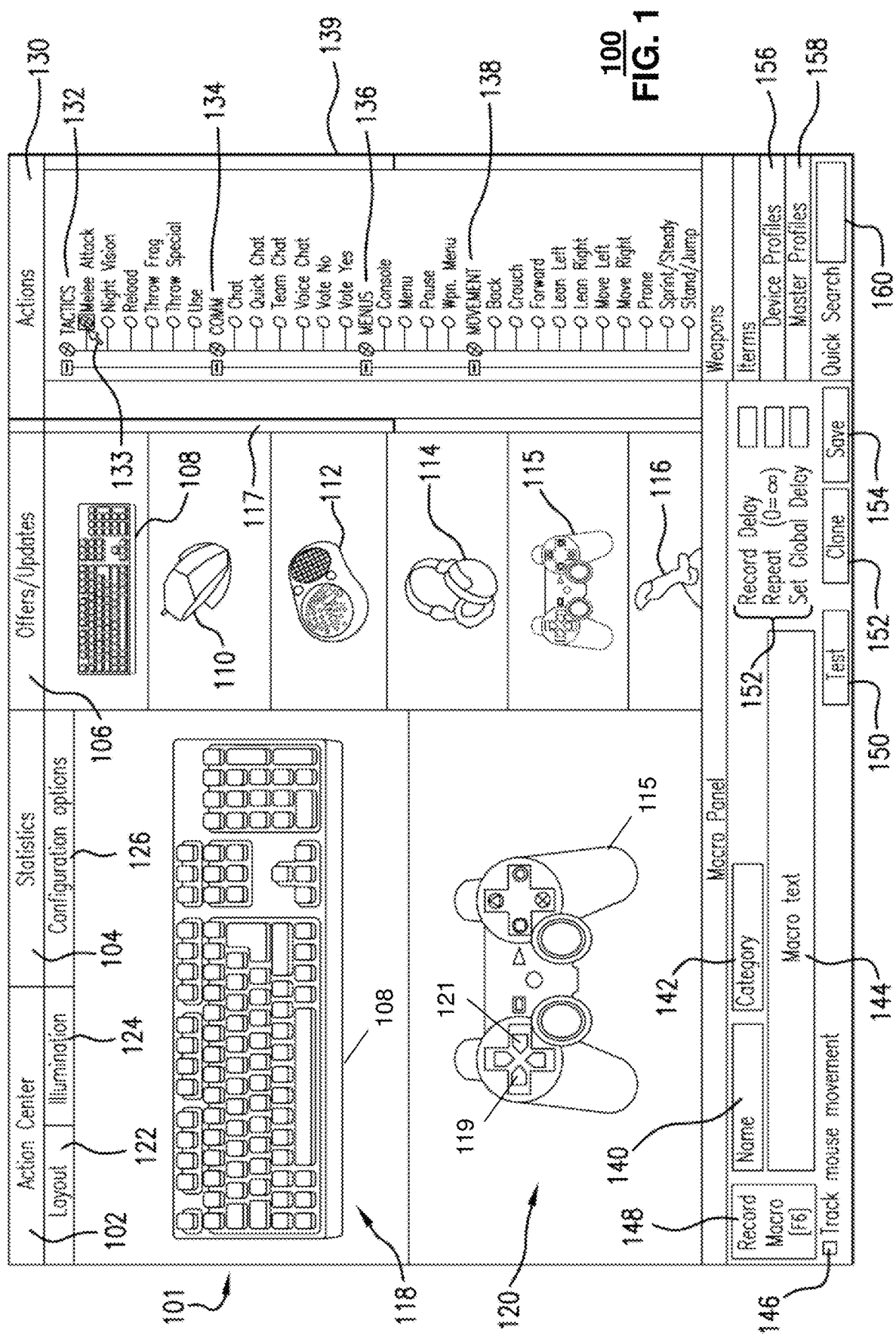
FIG. 1 depicts an illustrative embodiment of a Graphical User Interface (GUI) generated by an Accessory Management Software (AMS) application according to the present disclosure.

FIG. 1 depicts an illustrative embodiment of a Graphical User Interface (GUI) generated by an Accessory Management Software (AMS) application according to the present disclosure. The AMS application can be executed by a computing device such as a desktop computer, a laptop computer, a tablet, a server, a mainframe computer, a gaming console, a gaming accessory, or any combination or portions thereof. The AMS application can also be executed by portable computing devices such as a cellular phone, a personal digital assistant, or a media player. The AMS application can be executed by any device with suitable computing and communication resources.

Figure 2:
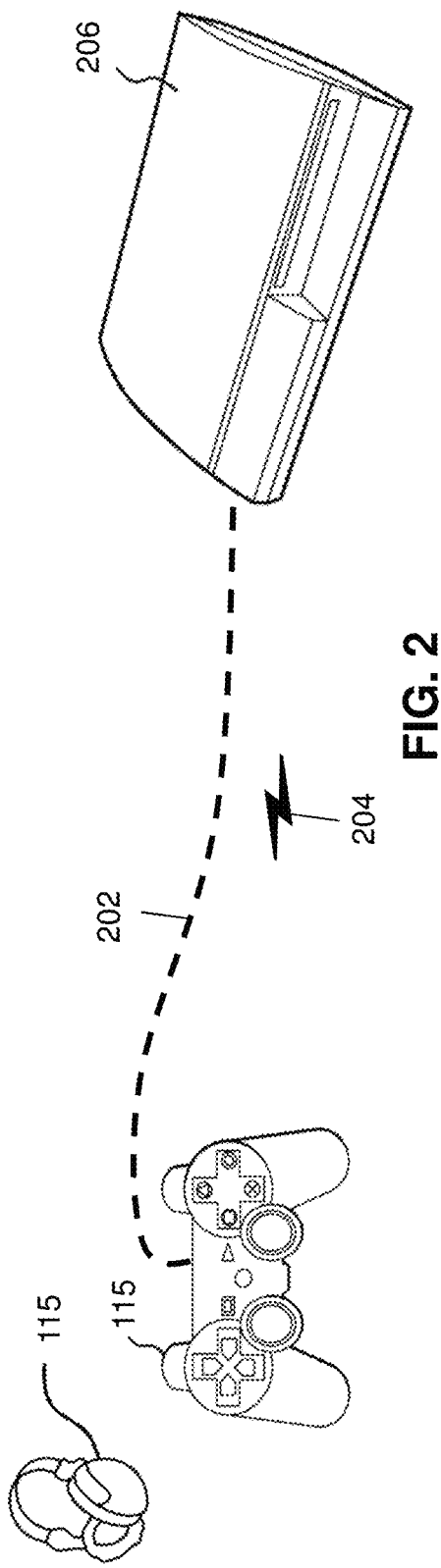
FIGS. 2-3 depict illustrative embodiments for communicatively coupling a gaming controller to a computing device.

FIG. 2 illustrates a number of embodiments for utilizing a gaming controller 115 with a computing device 206 in the form of a gaming console. In the illustration of FIG. 2, the gaming controller 115 can be communicatively coupled to the gaming console 206 with a tethered cable interface 202 such as a USB or proprietary cable, or a wireless interface 204 such as WiFi, Bluetooth, ZigBee, or a proprietary wireless communications protocol. The cable interface 202 provides a means for communication that may be less susceptible to electromagnetic interference. It will be appreciated that the gaming controller 115 may further include a headset 114 (with or without a microphone not shown) utilized by a gamer to communicate with teammates and/or to listen to game sounds in high fidelity. In the illustration of FIG. 2, the AMS application can in whole or in part be executed by the gaming controller 115, the gaming console 206, or a combination thereof.

Figure 3:
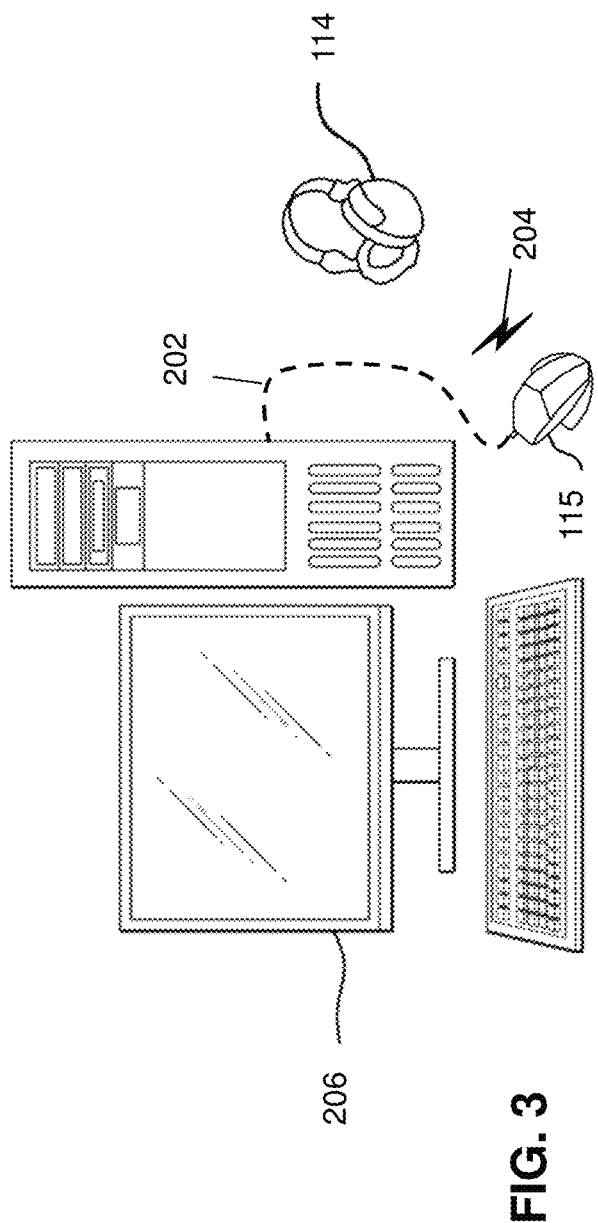

FIG. 3 illustrates a number of other embodiments for utilizing a gaming controller 115 with a computing device 206. In this embodiment, the gaming controller 115 comprises a mouse and the computing device 206 comprises a computer. The gaming controller 115 can be tethered to the computing device 206 by a cable interface 202 (e.g., USB cable or proprietary cable) or a wireless interface 204. The cable interface 202 provides a means for communication that may be less susceptible to electromagnetic interference. It will be appreciated that the gaming controller 115 may further include a headset (with or without a microphone not shown) utilized by a gamer to communicate with teammates and/or to listen to game sounds in high fidelity. In the illustration of FIG. 3, the AMS application can in whole or in part be executed by the gaming controller 115, the gaming console 206, or a combination thereof.

For illustration purposes, the terms gaming console 206 and computer 206 will be used hence forth interchangeably with the term computing device 206 with an understanding that a computing device 206 may represent a number of other devices such as a server, a tablet, a smart phone, and so on. Accordingly, a computing device 206 can represent any device with suitable computing resources to perform the methods described in the subject disclosure.

Figure 4:
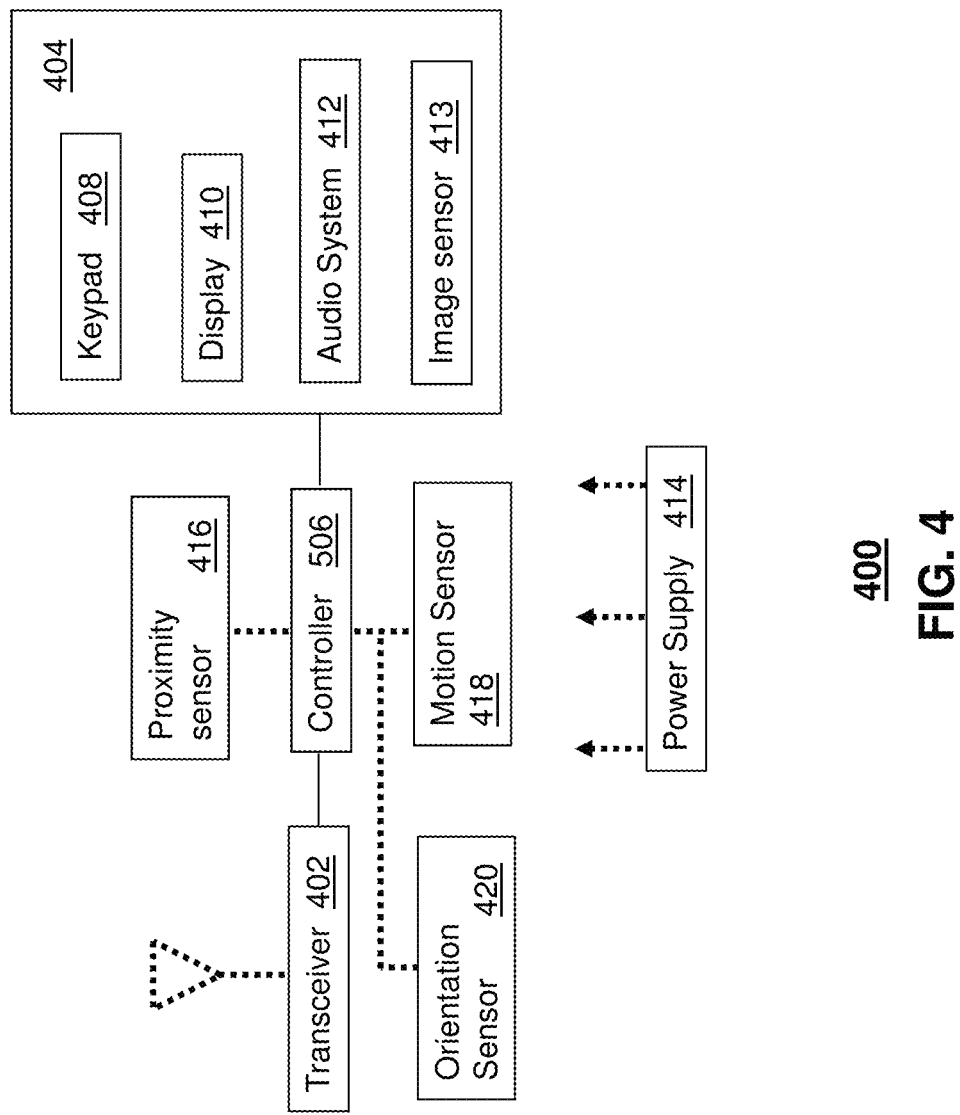
FIG. 4 depicts an illustrative embodiment of a communication device.

FIG. 4 depicts an illustrative embodiment of a communication device 400. Communication device 400 can serve in whole or in part as an illustrative embodiment of devices described in the subject disclosure. The communication device 400 can comprise a wireline and/or wireless transceiver 402 (herein transceiver 402), a user interface (UI) 404, a power supply 414, a proximity sensor 416, a motion sensor 418, an orientation sensor 420, and a controller 406 for managing operations thereof. The transceiver 402 can support short-range or long-range wireless access technologies such as Bluetooth, WiFi, Digital Enhanced Cordless Telecommunications (DECT), or cellular communication technologies, just to mention a few. Cellular technologies can include, for example, CDMA-1x, UMTS/HSDPA, GSM/GPRS, TDMA/EDGE, EV/DO, WiMAX, software defined radio (SDR), Long Term Evolution (LTE), as well as other next generation wireless communication technologies as they arise. The transceiver 402 can also be adapted to support circuit-switched wireline access technologies (such as PSTN), packet-switched wireline access technologies (such as TCP/IP, VoIP, etc.), and combinations thereof.

The UI 404 can include a depressible or touch-sensitive keypad 408 coupled to a navigation mechanism such as a roller ball, a joystick, a mouse, or a navigation disk for manipulating operations of the communication device 400. The keypad 408 can be an integral part of a housing assembly of the communication device 400 or an independent device operably coupled thereto by a tethered wireline interface (such as a USB cable) or a wireless interface supporting for example Bluetooth. The keypad 408 can represent a numeric keypad, and/or a QWERTY keypad with alphanumeric keys. The UI 404 can further include a display 410 such as monochrome or color LCD (Liquid Crystal Display), OLED (Organic Light Emitting Diode) or other suitable display technology for conveying images to an end user of the communication device 400.

In an embodiment where the display 410 utilizes touch-sensitive technology, a portion or all of the keypad 408 can be presented by way of the display 410 with navigation features. As a touch screen display, the communication device 400 can be adapted to present a user interface with graphical user interface (GUI) elements that can be selected by a user with a touch of a finger. The touch screen display 410 can be equipped with capacitive, resistive or other forms of sensing technology to detect how much surface area of a user's finger has been placed on a portion of the touch screen display. This sensing information can be used to control the manipulation of the GUI elements.

The UI 404 can also include an audio system 412 that utilizes common audio technology for conveying low volume audio (such as audio heard only in the proximity of a human ear) and high volume audio (such as speakerphone for hands free operation, stereo or surround sound system). The audio system 412 can further include a microphone for receiving audible signals of an end user. The audio system 412 can also be used for voice recognition applications. The UI 404 can further include an image sensor 413 such as a charged coupled device (CCD) camera for capturing still or moving images and performing image recognition therefrom.

The power supply 414 can utilize common power management technologies such as replaceable or rechargeable batteries, supply regulation technologies, and charging system technologies for supplying energy to the components of the communication device 400 to facilitate long-range or short-range portable applications. Alternatively, the charging system can utilize external power sources such as DC power supplied over a physical interface such as a USB port or by way of a power cord attached to a transformer that converts AC to DC power.

The proximity sensor 416 can utilize proximity sensing technology such as an electromagnetic sensor, a capacitive sensor, an inductive sensor, an image sensor or combinations thereof. The motion sensor 418 can utilize motion sensing technology such as an accelerometer, a gyroscope, or other suitable motion sensing technology to detect movement of the communication device 400 in three-dimensional space. The orientation sensor 420 can utilize orientation sensing technology such as a magnetometer to detect the orientation of the communication device 400 (North, South, West, East, combined orientations thereof in degrees, minutes, or other suitable orientation metrics).

The communication device 400 can use the transceiver 402 to also determine a proximity to a cellular, WiFi, Bluetooth, or other wireless access points by common sensing techniques such as utilizing a received signal strength indicator (RSSI) and/or a signal time of arrival (TOA) or time of flight (TOF). The controller 406 can utilize computing technologies such as a microprocessor, a digital signal processor (DSP), and/or a video processor with associated storage memory such as Flash, ROM, RAM, SRAM, DRAM or other storage technologies.

The communication device 400 as described herein can operate with more or fewer components described in FIG. 4 to accommodate the implementation of devices described by the subject disclosure. These variant embodiments are contemplated by the subject disclosure.

Figure 5:
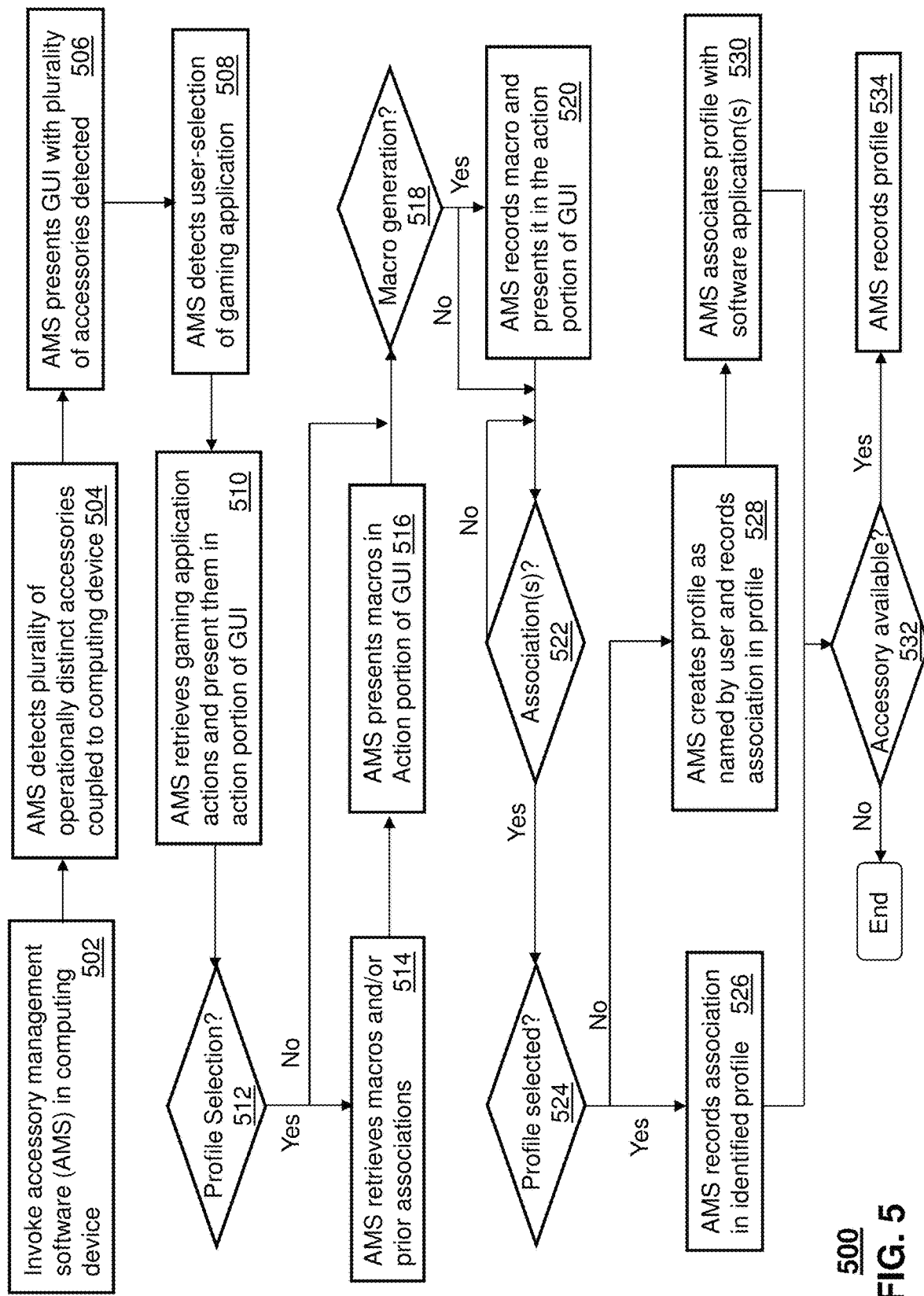
FIG. 5 depicts an illustrative embodiment of a first method utilized in the subject disclosure.
Figure 6:
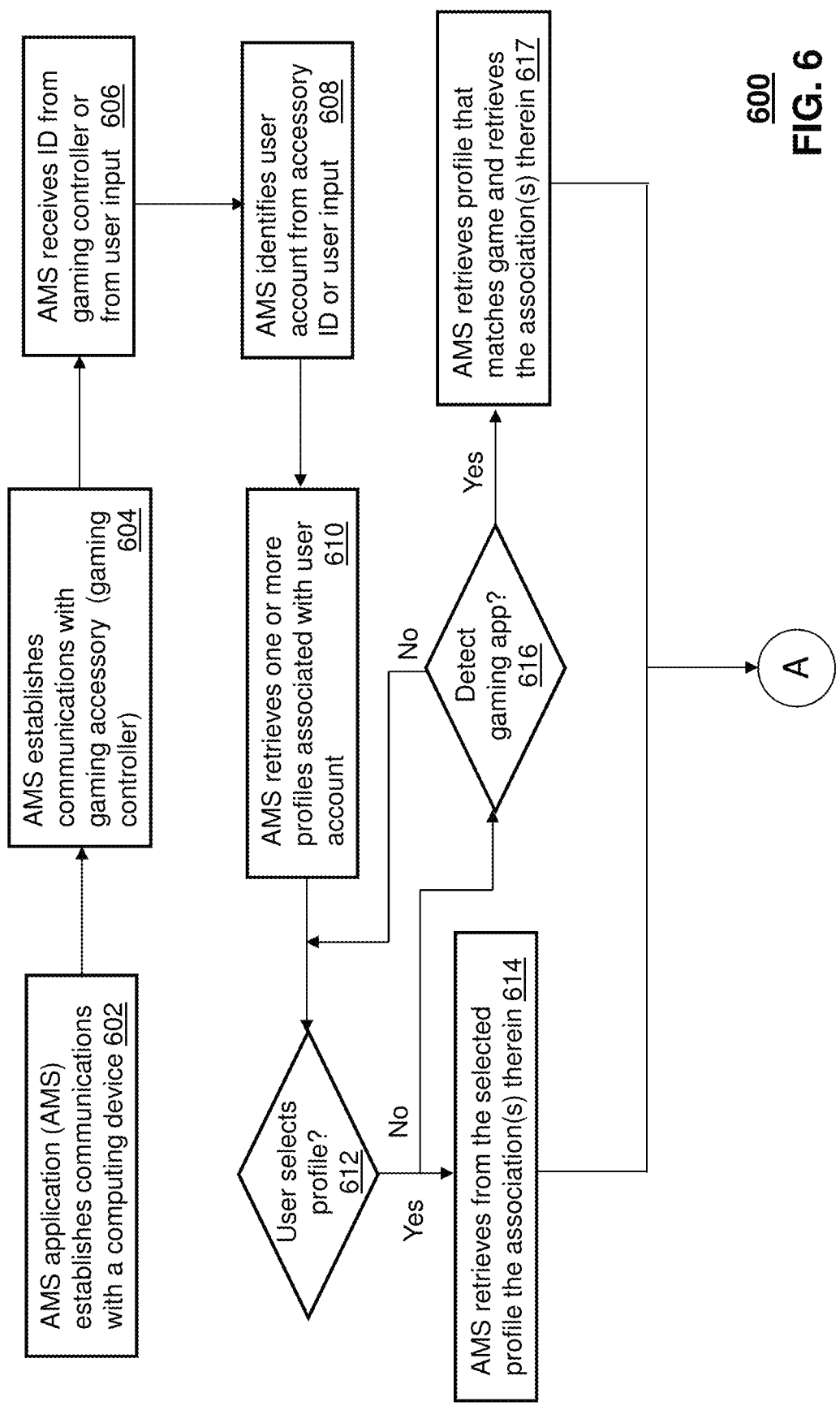
FIG. 6 depicts an illustrative embodiment of a second method utilized in the subject disclosure.
Figure 7:
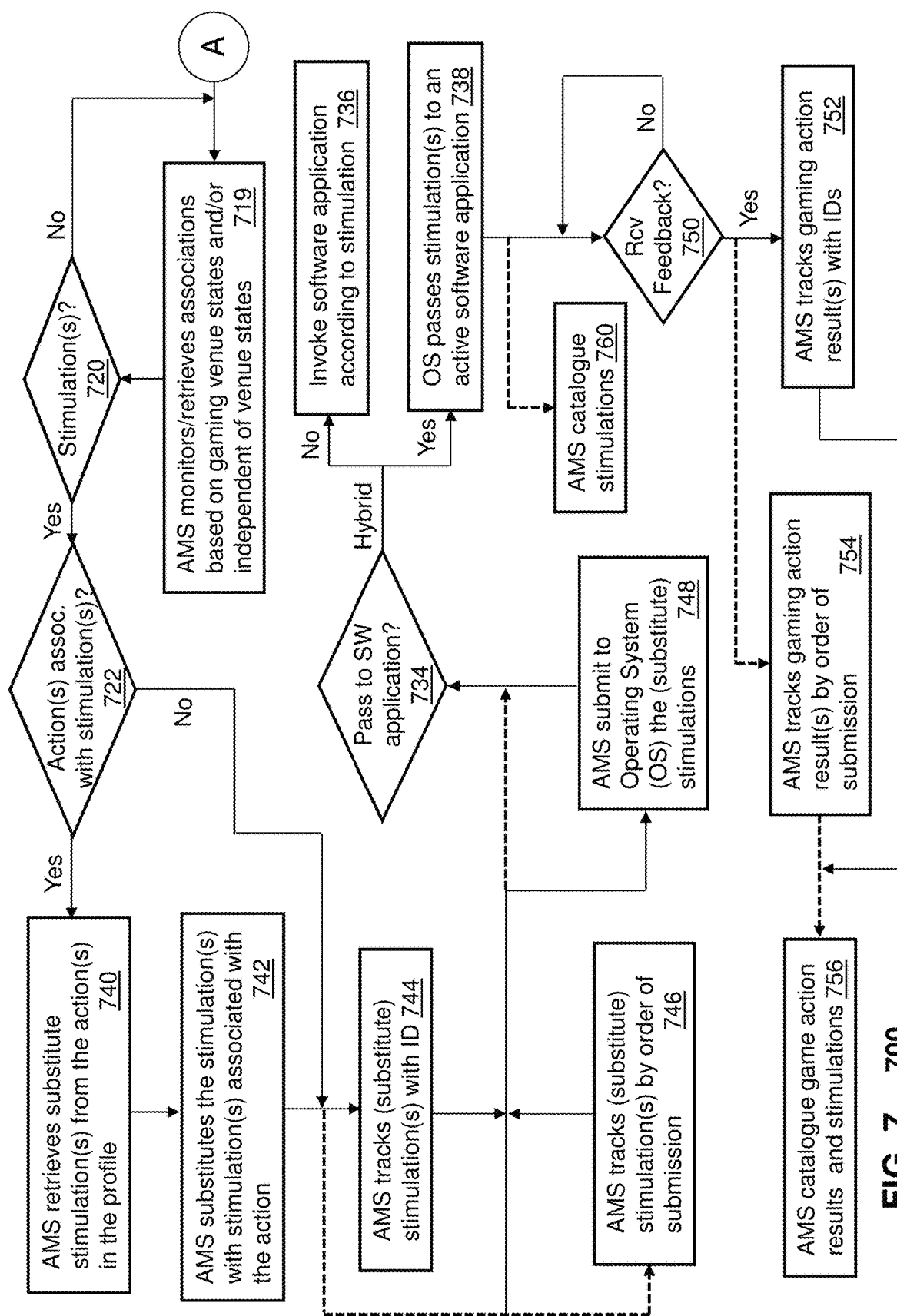
FIG. 7 depicts an illustrative embodiment of a third method utilized in the subject disclosure.

FIGS. 5-7 depict methods 500-700 describing illustrative embodiments of the AMS application. Method 500 can begin with step 502 in which the AMS application is invoked in a computing device. The computing device can be a remote server (not shown), the gaming console 206 or computer 206 of FIGS. 2-3, or any other computing device with suitable computing resources. The invocation step can result from a user selection of the AMS application from a menu or iconic symbol presented by the computing device 206, or when a user communicatively couples a gaming controller 115 or other form of accessory device with the computing device 206. In step 504, the AMS application can detect by way of software drivers in an operating system (OS) of the computing device 206 a plurality of operationally distinct accessories communicatively coupled to the computing device 206. The accessories can be coupled to the computing device 206 by a tethered interface (e.g., USB cable), a wireless interface (e.g., Bluetooth or Wireless Fidelity—WiFi), or combinations thereof.

In the present context, an accessory can represent any type of device which can be communicatively coupled to the computing device 206 (or which can be an integral part of the computing device) and which can control aspects of the OS and/or a software application operating from the computing device 206. An accessory can represent for example a keyboard, a touch screen display, a gaming pad, a gaming controller, a mouse, a joystick, a microphone, or a headset with a microphone—just to mention a few.

In step 506, the AMS application presents a GUI 101 such as depicted in FIG. 1 depicting operationally distinct accessories such as a keyboard 108, and a gaming controller 115. The GUI 101 presents the accessories 108-116 in a scrollable section 117. One or more accessories can be selected by a user with a mouse pointer. In this illustration, the keyboard 108 and the gaming controller 115 were selected for customization. Upon selecting the keyboard 108 and the gaming controller 115 from the scrollable window of section 117, the AMS application presents the keyboard 108 and the gaming controller 115 in split windows 118, 120, respectively, to assist the user during the customization process.

In step 508, the AMS application can be programmed to detect a user-selection of a particular software application such as a video game. This step can be the result of the user entering in a Quick Search field 160 the name of a gaming application (e.g., World of Warcraft™ or WoW). Upon identifying a gaming application, the AMS application can retrieve in step 510 from a remote or local database gaming application actions which can be presented in a scrollable section 139 of the GUI represented as "Actions" 130. The actions can be tactical actions 132, communication actions 134, menu actions 136, and movement actions 138 which can be used to invoke and manage features of the gaming application.

The actions presented descriptively in section 130 of the GUI can represent a sequence of accessory input functions which a user can stimulate by button depressions, navigation or speech. For example, depressing the left button on the mouse 110 can represent the tactical action "Reload", while the simultaneous keyboard depressions "Ctrl A" can represent the tactical action "Melee Attack". For ease of use, the "Actions" 130 section of the GUI is presented descriptively rather than by a description of the input function(s) of a particular accessory.

Any one of the Actions 130 can be associated with one or more input functions of the accessories being customized in windows 118 and 120 by way of a drag and drop action or other customization options. For instance, a user can select a "Melee Attack" by placing a mouse pointer 133 over an iconic symbol associated with this action. Upon doing so, the symbol can be highlighted to indicate to the user that the icon is selectable. At this point, the user can select the icon by holding the left mouse button and drag the symbol to any of the input functions (e.g., buttons) of the keyboard 108 or selectable options of the gaming controller 115 to make an association with an input function of one of these accessories. Actions of one accessory can also be associated with another accessory that is of a different category. For example, key depressions "Ctrl A" of the keyboard 108 can be associated with one of the buttons of the gaming controller 115 (e.g., the left button 119).

In one embodiment, a Melee Attack action can be associated by dragging this action to either the left button 119 or right button 120 of the gaming controller 115. Thus, when the selected button is depressed, the stimulus signal that is generated by the selected button of the gaming controller 115 can be substituted by the AMS application with the Melee Attack action. In another embodiment, the AMS application can be configured so that the Melee Action can be associated with a combination of key button presses (e.g., simultaneous depression of the left and right buttons 119, 121, or a sequence of button depressions: two rapid left button depressions followed by a right button depression).

In yet another embodiment, the AMS application can be configured so that the Melee Action can be associated with movement of the gaming controller 115 such as, for example, rapid movement or shaking of the gaming controller 115. In a further embodiment, the AMS application can be adapted to make associations with two dimensional or three dimensional movements of the gaming controller 115 according to a gaming venue state. For example, suppose the player's avatar enters a fighter jet. In this gaming venue state, moving the left navigation knob forward can be associated by the AMS application with controlling the throttle of the jet engines. Rapidly moving the gaming controller 115 downward can represent release of munitions such as a bomb.

In a gaming venue state where the gamer's avatar has entered a building, lifting of the gaming controller 115 above a first displacement threshold can be associated with a rapid movement of the avatar up one floor. A second displacement threshold can be associated with a rapid movement of the avatar down one floor—the opposite of the first displacement threshold. Alternatively, the second displacement threshold could be associated with a different action such as jumping between buildings when the avatar is on the roof of a building.

The AMS application can monitor gaming venue states by analyzing captured images produced by the gaming application (e.g., one or more still images of a tank, or a video of an avatar entering a tank), and/or by receiving messages from the gaming application by way of an application programming interface (API) thereby enabling the AMS application to identify the occurrence of a particular gaming venue state.

At step 512 the AMS application can also respond to a user selection of a profile. A profile can be a device profile or master profile invoked by selecting GUI button 156 or 158, each of which can identify the association of gaming actions with input functions of one or more accessories. If a profile selection is detected in step 512, the AMS application can retrieve in step 514 macro(s) and/or prior associations defined by the profile. The actions and/or macros defined in the profile can also be presented in step 516 by the AMS application in the actions column 130 of the GUI 101 to modify existing profile associations or create new associations.

In step 518, the AMS application can also respond to a user selection to create a macro. A macro in the present context can mean any actionable command which can be recorded by the AMS application. An actionable command can represent a sequence of stimuli generated by manipulating input functions of an accessory, a combination of actions in the Action section 130, an identification of a software application to be initiated by the OS of the computing device 206, or any other recordable stimulus to initiate, control or manipulate software applications. For instance, a macro can represent a user entering the identity of a software application (e.g., instant messaging tool) to be initiated by the OS upon the AMS application detecting a speech command using speech recognition technology.

A macro can also represent recordable speech delivered by a microphone singly or in combination with a headset for detection by another software application through speech recognition or for delivery of the recorded speech to other parties. In yet another embodiment a macro can represent recordable navigation of an accessory such as a joystick of the gaming controller 115, recordable selections of buttons of the gaming controller 115, and so on. Macros can also be combinations of the above illustrations with selected actions from the Actions 130 menu. Macros can be created from the GUI 101 by selecting a "Record Macro" button 148. The macro can be given a name and category in user-defined fields 140 and 142.

Upon selecting the Record Macro button 148, a macro can be generated by selection of input functions on an accessory (e.g., Ctrl A, speech, navigation knob movements of the gaming controller 115, etc.) and/or by manual entry in field 144 (e.g., typing the name and location of a software application to be initiated by an OS, such as an instant messaging application, keyboard entries such as Ctrl A, etc.). Once the macro is created, it can be tested by selecting button 150 which can repeat the sequence specified in field 144. The clone button 152 can be selected to replicate the macro sequence if desired. Fields 152 can also present timing characteristics of the stimulation sequence in the macro with the ability to modify and thereby customize the timing of one or more stimulations in the stimulation sequence. Once the macro has been fully defined, selection of button 154 records the macro in step 520. The recording step can be combined with a step for adding the macro to the associable items Actions column 130, thereby providing the user the means to associate the macro with input functions of the accessories (e.g., one or more keys of the keyboard 108, buttons of the gaming controller 115, etc.).

In step 522, the AMS application can respond to drag and drop associations of actions with input functions of the keyboard 108 or the gaming controller 115. Associations can also be made based on the two or three dimensional movements of the gaming controller 115. If user input indicates that a user is performing an association, the AMS application can proceed to step 524 where it can determine if a profile has been identified in step 512 to record the association(s) detected. If a profile has been identified, the associations are recorded/stored in the profile in step 526. If a profile has not been identified in step 512, the AMS application can create a profile in step 528 for recording the detected associations. In the same step, the user can name the newly created profile as desired. The newly created profile can also be associated with one or more gaming software applications in step 530 for future reference. The AMS application can also record in a profile in step 526 associations based on gaming venue states. In this embodiment the same stimuli generated by the gaming controller 115 can result in different substitutions based on the gaming venue state detected by the AMS application.

Referring back to step 526, once the associations have been recorded in a profile, the AMS application can determine in step 532 which of the accessories shown illustratively in FIGS. 1-3 are programmable and available for programming. If the AMS application detects that an accessory (e.g., keyboard 108, gaming controller 115) is communicatively coupled to the computing device 206 and determines that the accessory is capable of performing stimulus substitutions locally, the AMS application can proceed to step 534 of FIG. 5 where it submits the profile and its contents for storage in the accessory (e.g., the gaming controller 115 in FIGS. 2-3). Once the accessory (e.g., the gaming controller 115) is programmed with the profile, the accessory can perform stimuli substitutions according to the associations recorded by the AMS application in the profile. Alternatively, the AMS application can store the profile in the computing device 206 of FIGS. 2-3 and perform substitutions of stimuli supplied by the gaming controller 115 according to associations recorded in the profile by the AMS application.

The GUI 101 of FIG. 1 presented by the AMS application can have other functions. For example, the GUI 101 can present a layout of the accessory (button 122), how the accessory is illuminated when associations between input functions and actions are made (button 124), and configuration options for the accessory (button 126). The AMS application can adapt the GUI 101 to present more than one functional GUI page. For instance, by selecting button 102, the AMS application can adapt the GUI 101 to present a means to create macros and associate actions to accessory input functions as depicted in FIG. 1. Selecting button 104 can cause the AMS application to adapt the GUI 101 to present statistics from stimulation information and/or gaming action results captured by the AMS application as described in the subject disclosure. Selecting button 106 can also cause the AMS application to adapt the GUI 101 to present promotional offers and software updates.

The steps of method 500 in whole or in part can be repeated until a desirable pattern is achieved of associations between stimulus signals generated by accessories and substitute stimuli. It would be apparent to an artisan with ordinary skill in the art that there can be numerous other approaches to accomplish the embodiments described by method 500 or variants thereof. These undisclosed approaches are contemplated by the subject disclosure.

FIG. 6 depicts a method 600 for illustrating additional operations of the AMS application. In the configurations of FIGS. 2-3, the AMS application can be operating in whole or in part from the gaming controller 115, a gaming console 206, a computer 206, or a remote server (not shown). For illustration purposes, it is assumed the AMS application operates from the gaming console 206. Method 600 can begin with the AMS application establishing communications in steps 602 and 604 between the gaming console 206 and a gaming accessory such as the gaming controller 115, and a headset 114 such as shown in FIG. 1. These steps can represent for example a user starting the AMS application from the gaming console 206 and/or the user inserting at a USB port of the gaming console 206 a connector of a USB cable tethered to the gaming controller 115, which invokes the AMS application. In step 606, the gaming controller 115 and/or headset 114 can in turn provide the AMS application one or more accessory ID's, or the user can provide by way of a keyboard or the gaming controller 115 user identification. With the accessory ID's, or user input the AMS application can identify in step 608 a user account associated with the gaming controller 115 and/or headset 114. In step 610, the AMS application can retrieve one or more profiles associated with the user account.

In step 612, the user can be presented by way of a display coupled to the gaming console 206 profiles available to the user to choose from. If the user makes a selection, the AMS application proceeds to step 614 where it retrieves from the selected profiles the association(s) stored therein. If a selection is not made, the AMS application can proceed to step 616 where it can determine whether a software gaming application (e.g., video game) is operating from the gaming console 206 or whether the gaming console 206 is communicating with the software gaming application by way of a remote system communicatively coupled to the gaming console 206 (e.g., on-line gaming server(s) presenting, for example, World of Warcraft™). If a gaming software application is detected, the AMS application proceeds to step 617 where it retrieves a profile that matches the gaming application detected and the association(s) contained in the profile. As noted earlier, association(s) can represent accessory stimulations, navigation, speech, the invocation of other software applications, macros or other suitable associations that result in substitute stimulations. The accessory stimulations can be stimulations that are generated by the gaming controller 115, as well as stimulations from other accessories (e.g., headset 114), or combinations thereof.

Once a profile and its contents have been retrieved in either of steps 614 or step 617, the AMS application can proceed to step 719 of FIG. 7 where it monitors for a change in a gaming venue state based on the presentations made by the gaming application, or API messages supplied by the gaming application. At the start of a game, for example, the gaming venue state can be determined immediately depending on the gaming options chosen by the gamer. The AMS application can determine the gaming venue state by tracking the gaming options chosen by a gamer, receiving an API instruction from the gaming application, or by performing image processing on the video presentation generated by the gaming application. For example, the AMS application can detect that the gamer has directed an avatar to enter a tank. The AMS application can retrieve in step 719 associations for the gaming controller 115 for controlling the tank.

The AMS application can process movements of the gaming controller 115 forwards, backwards, or sideways in two or three dimensions to control the tanks movement. Similarly, rotating the gaming controller 115 or tilting the gaming controller 115 forward can cause an accelerometer, gyro or magnetometer of the gaming controller 115 to provide navigational data to the AMS application which can be substituted with an action to cause the tank to turn and/or move forward. The profile retrieved by the AMS application can indicate that the greater the forward tilt of the gaming controller 115, the greater the speed of the tank should be moving forward. Similarly, a rear tilt can generate navigation data that is substituted with a reverse motion and/or deceleration of the forward motion to stop or slow down the tank. A three dimensional lift of the mouse can cause the tank to steer according to the three dimensional navigation data provided by the gaming controller 115. For example, navigation data associated with a combination of a forward tilt and right bank of the gaming controller 115 can be substituted by the AMS application to cause an increase in forward speed of the tank with a turn to the right determined by the AMS application according to a degree of banking of the gaming controller 115 to the right. In the above embodiment, the three dimensional navigation data allows a gamer to control any directional vector of the tank including speed, direction, acceleration and deceleration.

In another illustration, the AMS application can detect a new gaming venue state as a result of the gamer directing the avatar to leave the tank and travel on foot. Once again the AMS application retrieves in step 719 associations related to the gaming venue state. In this embodiment, selection of buttons of the gaming controller 115 can be associated by the AMS application with weaponry selection, firing, reloading and so on. The movement of the gaming controller 115 in two or three dimensions can control the direction of the avatar and/or selection or use of weaponry. Once the gaming venue state is detected in step 719, the AMS application retrieves the associations related to the venue state, and can perform substitutions of stimuli generated by the gaming controller 115, and/or speech commands received by microphone of the headset 114.

In one embodiment, the AMS application can be configured in step 719 to retrieve a profile that provides substitute stimuli for replacing certain stimuli generated by accessories. The associations recorded in the profile can be venue independent. In another embodiment, the AMS application can retrieve a combination of profiles, where one or more profiles provide substitute stimuli that are venue dependent and one or more other profiles provide substitute stimuli that are venue independent.

The AMS application can monitor in step 720 stimulations generated by the accessories coupled to the gaming console 206. The stimulations can be generated by the gamer by manipulating the gaming controller 115, and/or by generating speech commands detected by a microphone of the headset 114. If a stimulation is detected at step 720, the AMS application can determine in step 722 whether to forward the detected stimulation(s) to an Operating System (OS) of the gaming console 206 or the gaming application directly without substitutions. This determination can be made by comparing the detected stimulation(s) to corresponding associations in one or more profiles retrieved by the AMS application. If the detected stimulation(s) match the associations, then the AMS application proceeds to step 740 where it retrieves substitute stimulation(s) in the profile(s). In step 742, the AMS application can substitute the detected stimulation(s) with the substitute stimulations in the profile(s).

In one embodiment, the AMS application can track in step 744 the substitute stimulations by updating the stimulations with a unique identifier such as a globally unique identifier (GUID). In this embodiment, the AMS application can also add a time stamp to each substitute stimulation to track when the substitution was performed. In another embodiment, the AMS application can track each substitute stimulation according to its order of submission to the gaming application. For instance, sequence numbers can be generated for the substitute stimulations to track the order in which they were submitted to the gaming application. In this embodiment, the substitute stimulations do not need to be updated with sequence numbers or identifiers so long as the order of gaming action results submitted by the gaming application to the AMS application remain in the same order as the substitute stimulations were originally submitted.

For example, if a first stimulation sent to the gaming application by the AMS application is a command to shoot, and a second stimulation sent to the gaming application is a command to shoot again, then so long as the gaming application provides a first a game action result for the first shot, followed by a game action result for the second shot, then the substitute stimulations will not require updating with sequence numbers since the game action results are reported in the order that the stimulations were sent. If on the other hand, the game action results can be submitted out of order, then updating the stimulations with sequence numbers or another suitable identifier would be required to enable the AMS application to properly track and correlate stimulations and corresponding gaming action results.

Referring back to step 722, if the detected stimulation(s) do not match an association in the profile(s), then the AMS application proceeds to one of steps 744 or 746 in order to track the stimulations of the accessory as described above. In another embodiment, tracking of original stimulations or substitute stimulations can be bypassed by skipping steps 744 or 746 and proceeding to step 770 of FIG. 7B.

Once the stimulations received in step 720 have been substituted with other stimulations at step 742 responsive to a detected association, or maintained unchanged responsive to detecting no association with substitute stimuli, and (optionally) the AMS application has chosen a proper tracking methodology for correlating gaming action results with stimulations, the AMS application can proceed to step 748 or 734.

Once the AMS application at step 748 supplies to the OS of the computing device 206 a gaming action (i.e., one or more substitute or original stimulations), the AMS application can proceed to step 734. The gaming action supplied to the OS at step 748 can be the unadulterated "original" gaming action of step 770, or an alternative gaming action generated by steps 794 or 796. At step 734, the OS determines whether to invoke in step 736 a software application identified in the stimulation(s) (e.g., gamer says "turn on team chat", which invokes a chat application), whether to forward the received stimulation(s) to the gaming software application in step 738, or a combination thereof. Alternatively, the AMS application can bypass step 748 and proceed to step 734 without invoking functions of the OS to determine whether to invoke a software application at step 736 or supply the gaming action (i.e., substitute or original stimulations) to the gaming software application in step 738, or a combination thereof. In yet another embodiment, tracking can be bypassed whereby original or substitute stimulations are processed by the AMS application at step 748, or step 734 without invoking functions of the OS at step 748 as previously described.

Contemporaneous to the embodiments described above, the AMS application can monitor in step 750 for game action results supplied by the gaming application via API messages previously described. For instance, suppose the stimulation sent to the gaming application in step 738 is a command to shoot a pistol. The gaming application can determine that the shot fired resulted in a miss of a target or a hit. The gaming application can respond with a message which is submitted by way of the API to the AMS application that indicates the shot fired resulted in a miss or a hit. If IDs such as GUIDs were sent with each stimulation, the gaming application can submit game action results with their corresponding GUID to enable the AMS application to correlate the gaming action results with stimulations having the same GUID.

For example, if the command to shoot included the ID "1234", then the game action result indicating a miss will include the ID "1234", enabling the AMS application in step 752 to correlate the game action result to the stimulation having the same ID. If on other hand, the order of game action results can be maintained consistent with the order of the stimulations, then the AMS application can correlate in step 754 stimulations with game action results by the order in which stimulation were submitted and the order in which game action results are received. In step 756, the AMS application can catalogue stimulations and game action results. In another embodiment, the AMS application can be adapted to catalogue the stimulations in step 760. In this embodiment, step 760 can be performed as an alternative to steps 750 through 756. In another embodiment, step 760 can be performed in combination with steps 750 through 756 in order to generate a catalogue of stimulations, and a catalogue for gaming action results correlated to the stimulations.

Figure 8:
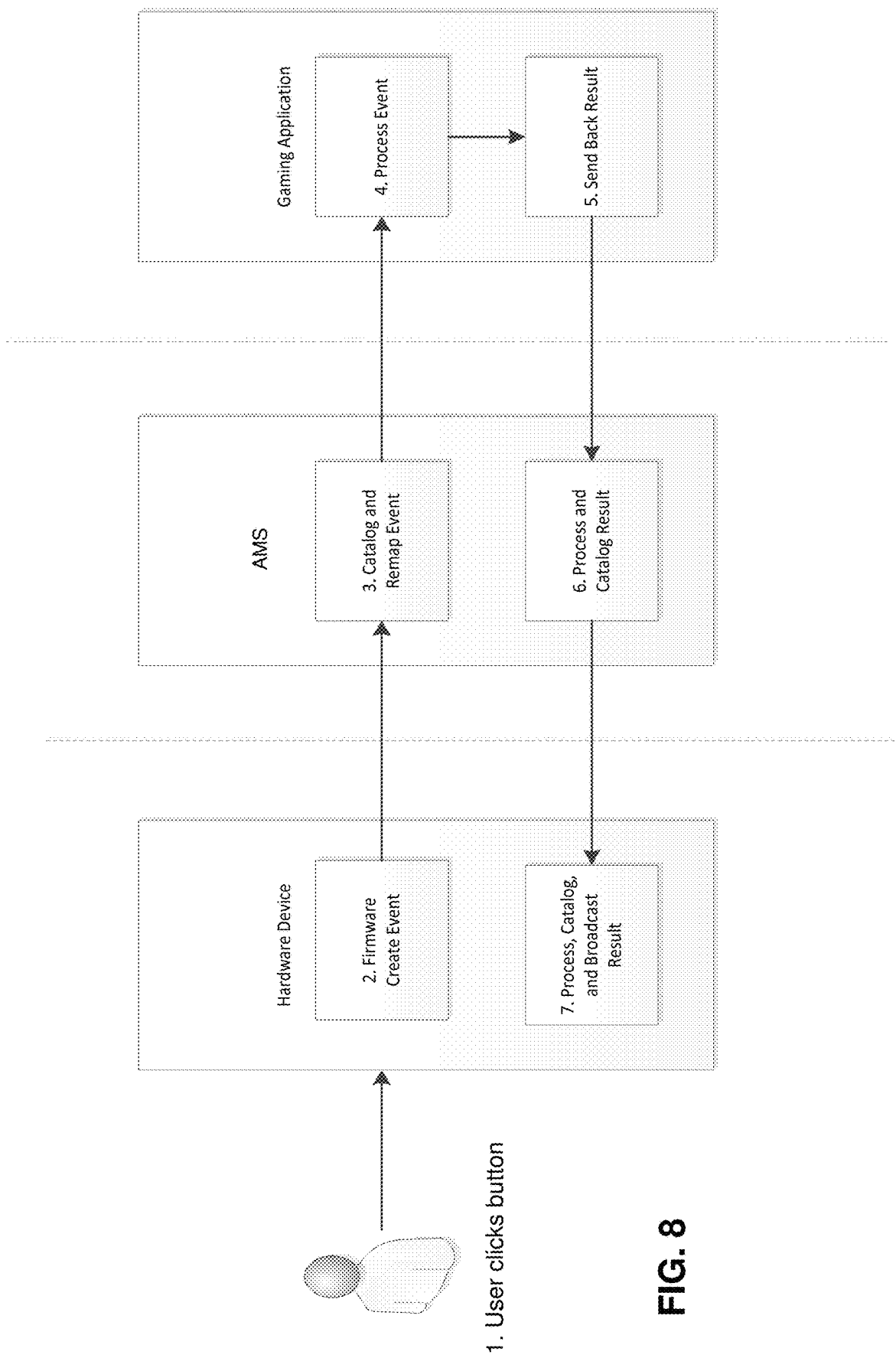
FIG. 8 depicts an illustrative embodiment of a system operating at least in part according to the methods of FIGS. 5-7.
Figure 9:
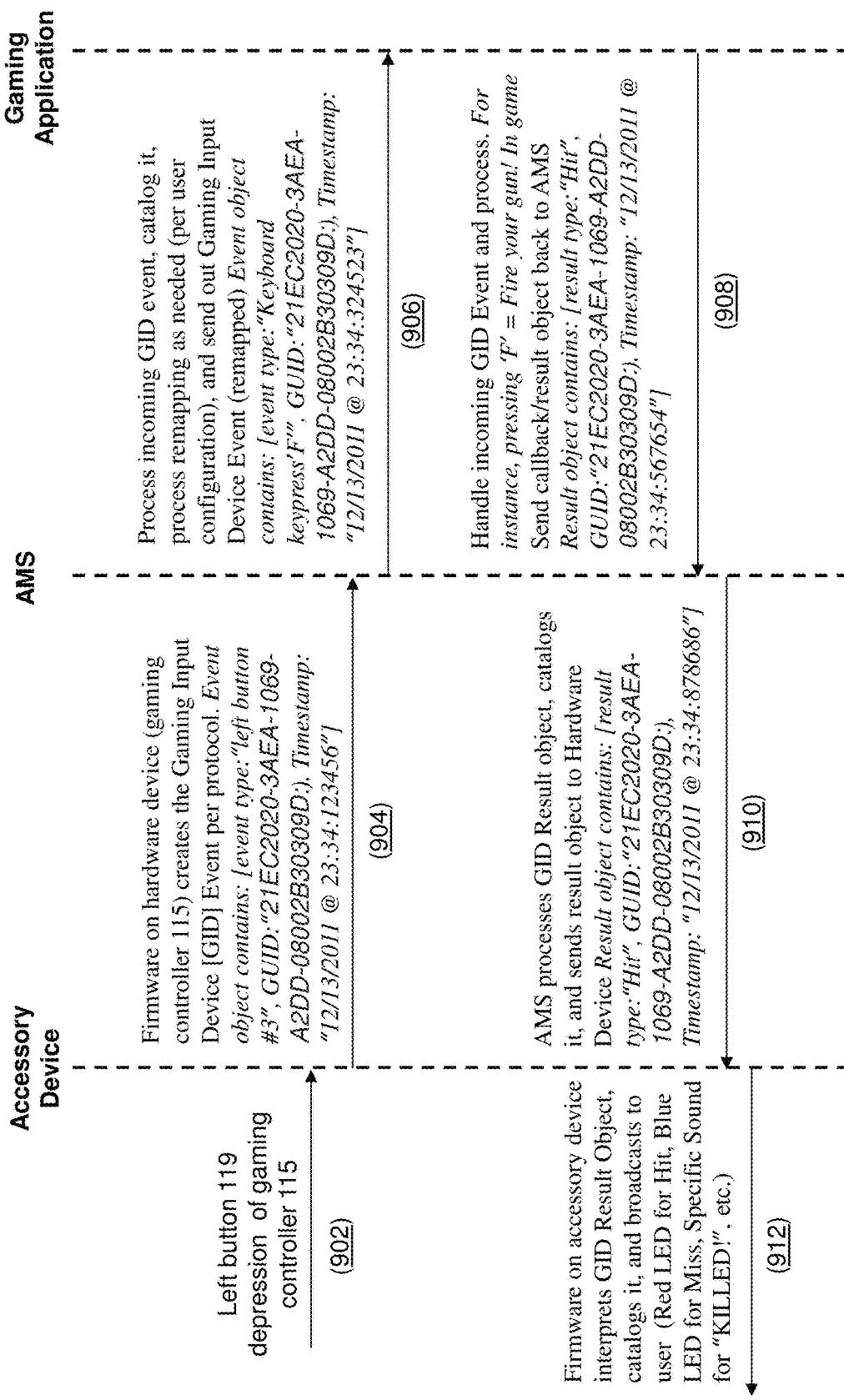
FIG. 9 depicts an illustrative embodiment of a communication flow diagram utilized by the system of FIG. 2.

FIGS. 8-9 illustrate embodiments of a system with a corresponding communication flow diagram for correlating stimulations and gaming action results. In this illustration a user clicks the left button 119 of the gaming controller 115. The gaming controller 115 can include firmware (or circuitry), which creates an event as depicted by event 2 in FIG. 8. The button depression and the event creation are depicted in FIG. 9 as steps 902 and 904. In step 904, the firmware of the gaming controller 115 can, for example, generate an event type "left button #3", and a unique GUID with a time stamp which is submitted to the AMS application. Referring back to FIG. 8, the AMS application catalogues event 3, and if a substitute stimulation has been predefined, remaps the event according to the substitution. The remapped event is then transmitted to the gaming application at event 4. Event 3 of FIG. 8 is depicted as step 906 in FIG. 9. In this illustration, the AMS application substitutes the left button #3 depression stimulus with a "keyboard 'F'" depression which can be interpreted by the gaming application as a fire command. The AMS application in this illustration continues to use the same GUID, but substitutes the time stamp for another time stamp to identify when the substitution took place.

Referring back to event 4, the gaming application processes the event and sends back at event 5 a game action result to the AMS application which is processed by the AMS application at event 6. The AMS application then submits the results to the accessory at event 7. Events 4 and 5 are depicted as step 908 in FIG. 9. In this step, the gaming application processes "F" as an action to fire the gamer's gun, and then determines from the action the result from logistical gaming results generated by the gaming application. In the present illustration, the action of firing resulted in a hit. The gaming application submits to the AMS application the result type "Hit" with a new time stamp, while utilizing the same GUID for tracking purposes. At step 910, the AMS application correlates the stimulation "left button #3 (and/or the substitute stimulation keyboard "F") to the game result "Hit" and catalogues them in memory. The AMS application then submits to the accessory (e.g., gaming controller 115) in step 910 the game action results "Hit" with the same GUID, and a new time stamp indicating when the result was received. Upon receiving the message from the AMS application, the accessory in step 912 processes the "Hit" by asserting a red LED on the accessory (e.g., left button 119 illuminates in red or other LED of the gaming controller 115 illuminates in red) to indicate a hit. Other notification notices can be used such as another color for the LED to indicate misses, a specific sound for a hit, or kill, a vibration or other suitable technique for notifying the gamer of the game action result.

Upon reviewing the aforementioned embodiments, it would be evident to an artisan with ordinary skill in the art that the embodiments of the subject disclosure can be modified, reduced, or enhanced without departing from the scope of the claims described below. For example, the AMS application can be executed from an accessory 115 or computing device 206 to perform the embodiments described in the subject disclosure. The AMS application can also be operated from a remote server ("cloud services"). In yet another embodiment, functions of the AMS application can be distributed between devices. In yet another embodiment, the AMS application can be configured to track the performance of a gamer and adapt a threshold as the gamer improves or declines in performance.

For instance, as a gamer's performance improves with a particular gaming action, the threshold associated with the gaming action can be adapted to be less sensitive in detecting an over usage state. Similarly, the sensitivity of the threshold can be increased to promptly identify an over usage state of a gaming action if the gamer's performance declines as a result of an over usage of the gaming action. Additionally, the AMS application can be adapted to add gaming actions to an exclusion table when the gamer's performance substantially improves as a result of using the gaming action being excluded. The exclusion table can also be changed by the AMS application by removing a gaming action from the exclusion table responsive to its excessive use causing a decline in a gamer's performance.

Other embodiments can be applied to the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

The subject disclosure further includes the embodiments described below, which may be combined in whole or in part with any other embodiments described herein.

Figure 10:
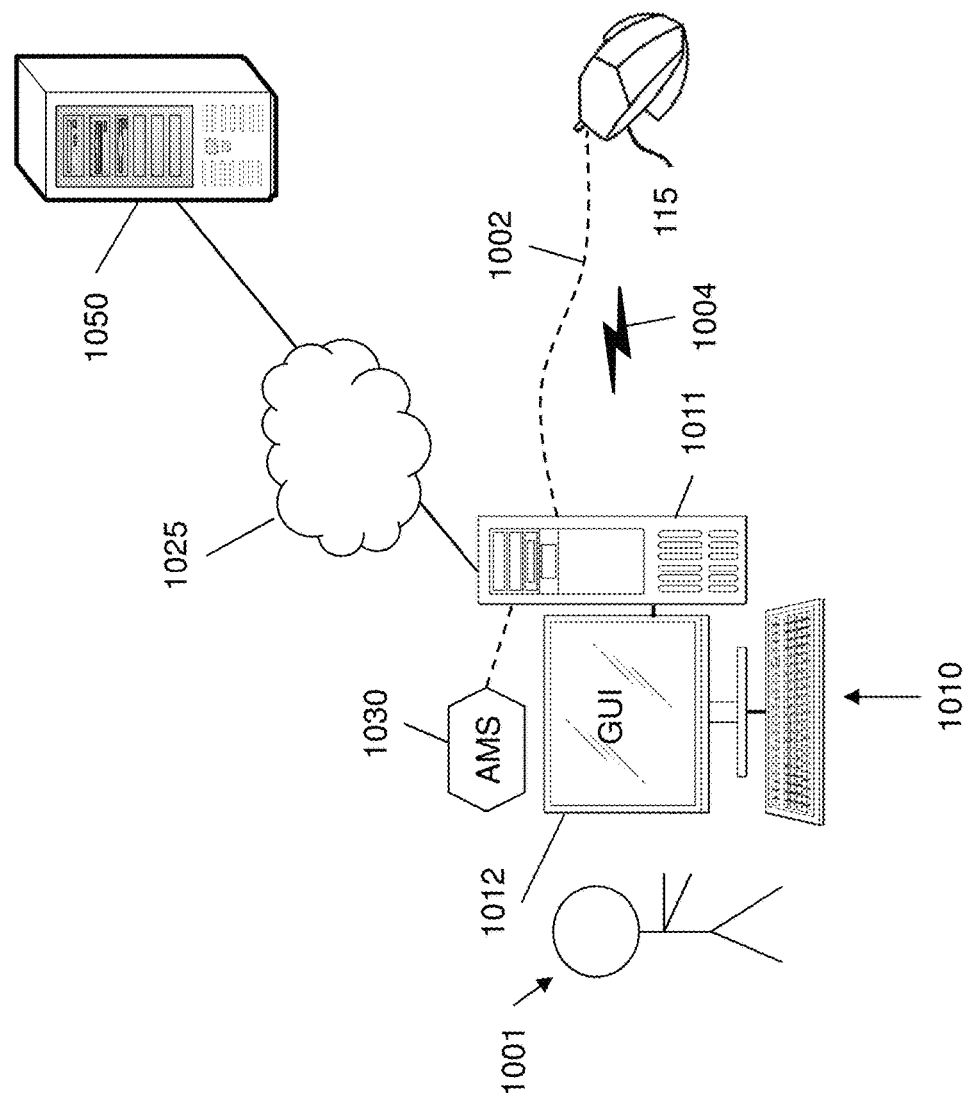
FIG. 10 schematically illustrates customizing a gaming accessory, in accordance with an embodiment of the disclosure.

FIG. 10 schematically illustrates an arrangement 1000 in which a user 1001 can customize features of a gaming accessory, in accordance with an embodiment of the disclosure. The gaming accessory is represented by a mouse 115. As noted above, the gaming accessory can be any of a variety of devices, including for example a keyboard, a touch screen display, a gaming pad, a gaming controller, a joystick, a microphone, a headset with a microphone, etc. In one embodiment, the gaming accessory can be the gaming device, such as a mobile phone with a touch sensitive screen.

As shown in FIG. 10, user 1001 can customize gaming accessory (mouse) 115 using computer 1010 which includes a processor 1011 and a display device 1012. Processor 1011 executes Accessory Management Software (AMS) application 1030; in this embodiment the AMS application is obtained from server 1050 which is accessible via the cloud 1025. As noted above with reference to FIGS. 1-3, the AMS application can be executed by a computing device such as a desktop computer, a laptop computer, a tablet, a server, a mainframe computer, a gaming console, a gaming accessory, or any combination or portions thereof. The AMS application can also be executed by portable computing devices such as a cellular phone, a personal digital assistant, or a media player.

More generally, the AMS application can be executed by any device with suitable computing and communication resources. In an embodiment, the AMS application can reside on the gaming accessory (e.g. mouse 115). Other exemplary embodiments can include customizing the gaming accessory utilizing other techniques, including customization via a graphical user interface provided by a network server for presentation at a user's computing device. In this example, the customization settings can be stored in the network server(s), such as via cloud computing and then later retrieved or otherwise accessed for configuration of the gaming accessory or configuration of a different gaming accessory.

Display device 1012 presents a Graphical User Interface (GUI) generated by the AMS application. In this embodiment, the user can be presented with an illustration of mouse 115, with selectable (clickable) regions corresponding to the buttons or other control components (e.g. a thumbwheel) whose functions can be customized using the AMS application. Instructions for customizing the mouse functions can be transmitted to the mouse from computer 1010 using a wireless interface 1004. In another embodiment, the instructions can be transmitted using a wired connection 1002.

In this embodiment, the mouse 115 can deliver a rumble effect via one or more of its buttons, keys, thumbwheel(s), etc. The term "rumble effect" in a gaming accessory generally refers to a vibration produced in the accessory and perceptible by a user holding the accessory. In these embodiments, the mouse 115 can be programmed to deliver a distinct vibration when a different button or key is depressed or released, or when a thumbwheel is activated. The rumble can have a distinct duration when a particular button is pressed or released, and can be delayed relative to a pressing/releasing event for the button. One or more of the exemplary embodiments can include the vibration of the rumble effect being utilized in conjunction with or replaced by other tactile effects presented at the gaming accessory.

Figure 11:
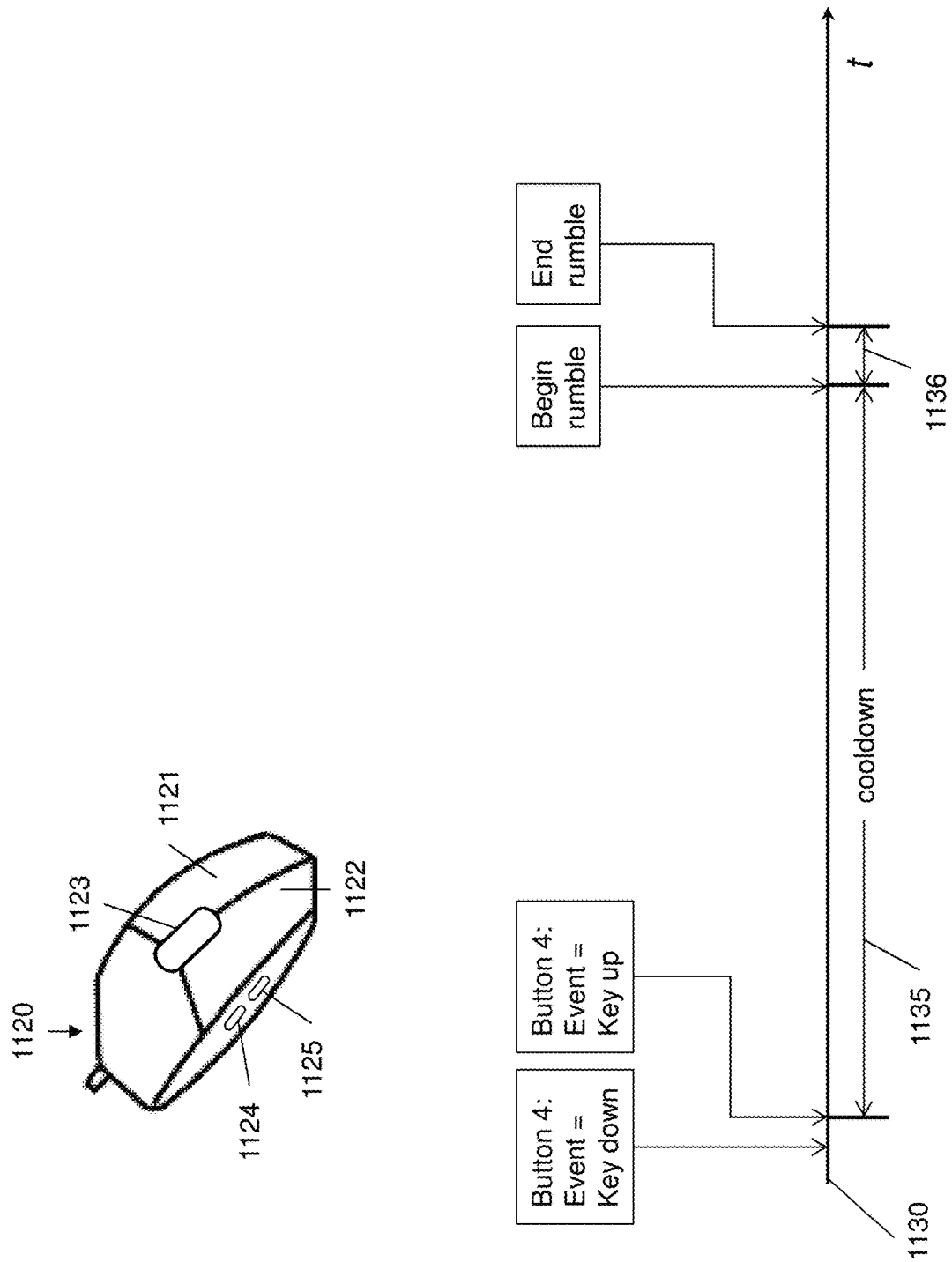
FIG. 11 schematically illustrates a gaming accessory having a control button with a rumble effect bound to a game event, in accordance with an embodiment of the disclosure.

FIG. 11 schematically illustrates a gaming accessory having a control button with a rumble effect bound to a game event, in accordance with an embodiment of the disclosure. As shown in FIG. 11, mouse 1120 has five control buttons 1121-1125. In a given game situation, a particular mouse button can be used to perform a distinct action (e.g. fire a weapon, cast a spell, etc.). In this embodiment, mouse 1120 can be programmed using the AMS so that any of the buttons 1121-1125 can deliver a rumble effect in accordance with the user pressing or releasing that button.

In this example, button 1124 is used in a game to cast a healing spell (that is, the user has bound Button 4 of the mouse to action "Heal"). According to constraints imposed by the game in this example, the spell cannot be recast until a predetermined time period has elapsed (a "cooldown" period). The mouse can then be configured so that, when the button is released and the action is thereby concluded, a timer is activated to mark the cooldown period. At the end of the cooldown period, the mouse delivers a rumble to alert the user that the cooldown period has expired and the spell can be cast again. This example is schematically illustrated using timeline 1130. The button 1124 is used to cast the healing spell; the game requires a cooldown period of 10 seconds after the spell is cast. On timeline 1130, a "key down" event for the button is followed by a "key up" event. The "key up" event is bound to a timer that marks the cooldown period 1135. At the end of the cooldown period (that is, "key up" event+10 seconds), the mouse delivers a rumble with a duration 1136.

It will be appreciated that the mouse 1120 can be configured so that each of the buttons 1121-1124 is associated with a different gaming action (which can vary from one game to another in a plurality of games) and a distinct rumble effect for each button can serve as a distinct signal to the user. Furthermore, it will be appreciated that controls on various types of gaming accessories can be associated with different rumble effects. Accordingly, different rumble effects can be programmed using the AMS, for each control on a given accessory and for each game.

Figure 12:
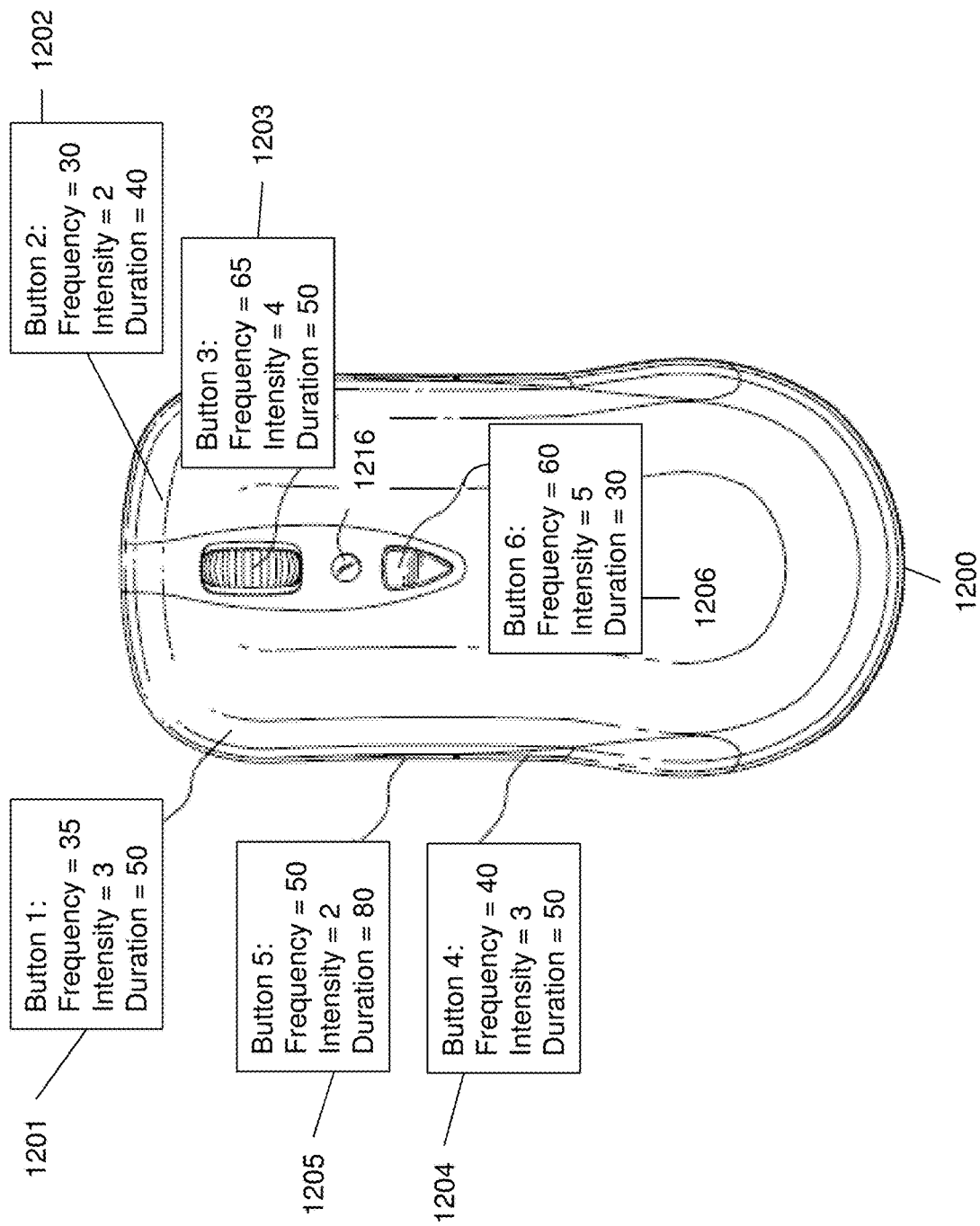
FIG. 12 schematically illustrates a gaming accessory having control buttons customized for rumble effects, in accordance with an embodiment of the disclosure.

FIG. 12 schematically illustrates a gaming accessory having control buttons customized for rumble effects, in accordance with an embodiment of the disclosure. The gaming accessory (in this example, mouse 1200) is shown with six buttons, each customizable with a rumble effect, and a light-emitting device 1216. In an embodiment, an image of mouse 1200 as shown in FIG. 12 is displayed on display device 1012 as a GUI, with boxes 1201-1206 associated with the respective buttons. Each box has parameters, selected and entered by the user, characterizing the rumble effect for the associated button. In this embodiment, the parameters can include the vibration frequency and duration of the rumble, and an intensity of the rumble as perceived by the user.

For example, the user can select box 1204 and thereby customize a rumble effect for Button 4 via the GUI. In this example, the user selects a vibration frequency of 40 Hz, with an intensity of 3 (on a user-defined scale of 1 to 5), for a duration of 50 milliseconds. As described above with reference to FIG. 11, the rumble effect can also be delayed with respect to a button event (e.g. 10 seconds after "key up"). In an embodiment, the rumble effect can be further customized so that the vibration has a varying intensity (e.g. increasing/decreasing intensity or pulsed over the duration of the rumble).

Figure 13:
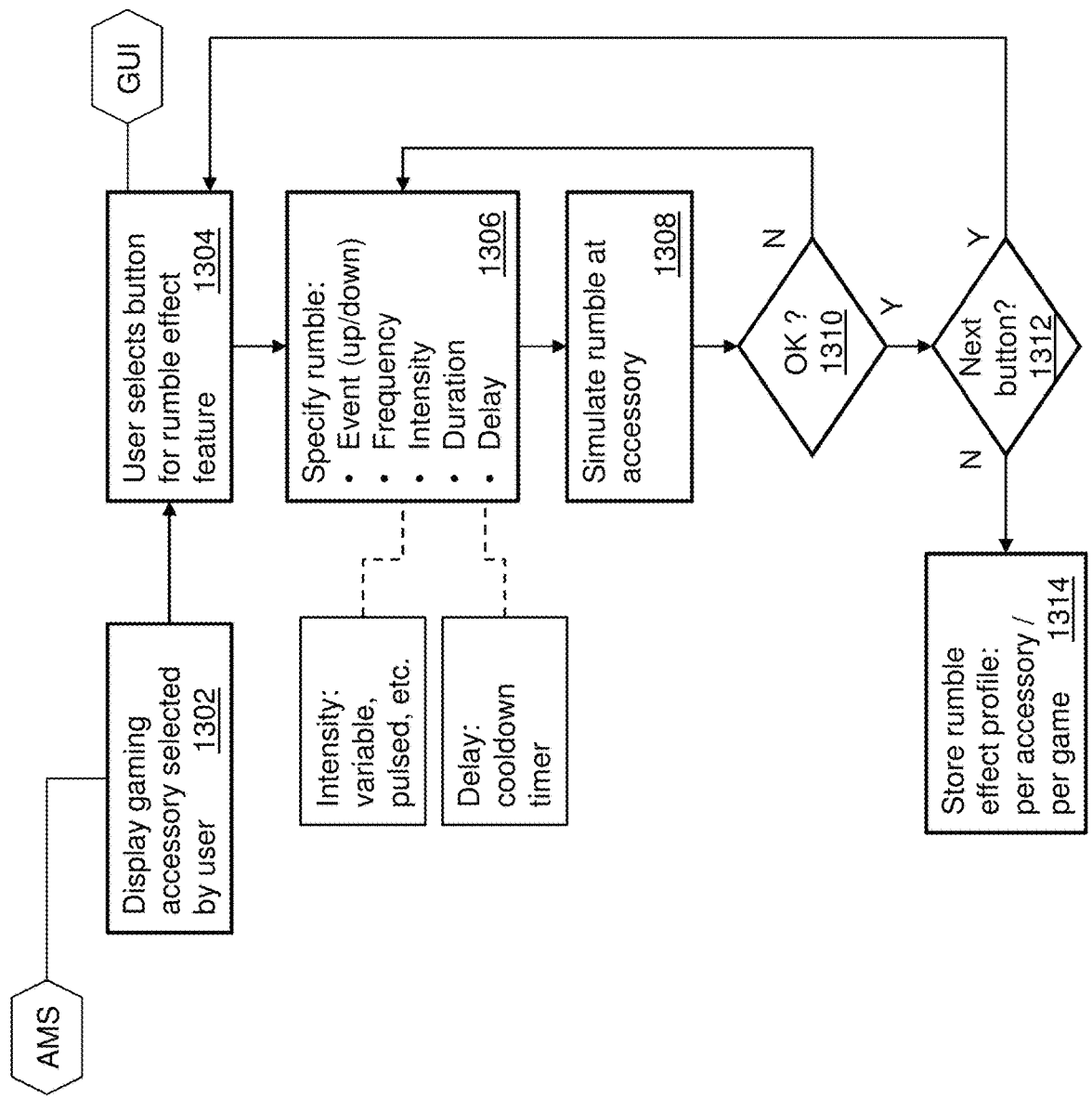
FIG. 13 is a flowchart illustrating a method for customizing a gaming accessory, in accordance with an embodiment of the disclosure.

FIG. 13 is a flowchart illustrating a method 1300 for customizing rumble effects in a gaming accessory, in accordance with an embodiment of the disclosure. In step 1302, the user invokes the AMS application to select an accessory and display an image of that accessory. In this embodiment, the image of the accessory comprises a GUI, so that selectable portions of the GUI correspond to different controls (e.g. mouse buttons) on the accessory. The user selects a button (step 304) to customize a rumble effect feature for that button. The user can specify parameters for the rumble effect (step 1306), including the button event associated with the rumble (e.g. key up/key down), the vibration frequency, the vibration intensity, the duration of the rumble, and/or a delay with respect to the selected event. The intensity, which can be specified on a user-defined scale, can be variable or pulsed during the rumble. The delay can be specified in accordance with a game requirement (e.g. a cooldown period). The rumble effect can thus be customized with user-selected parameters including, for example, a control component of the gaming accessory, an event associated with the control component, a vibration frequency associated with the event, a duration of the vibration, or any combination of those parameters.

In an embodiment, the AMS can generate a simulated rumble at the accessory (step 1308), so that the user can test the rumble effect (step 1310) and modify the parameters if desired. In particular, a simulated rumble can be used to calibrate the user-defined intensity scale for the vibration.

A rumble effect can thus be specified for each button, or other type of control, on the accessory (step 1312). The configuration of the accessory will then include a profile of rumble effects for that accessory, which in general will vary from one game to another. The rumble effects profile can then be stored (step 1314) at the accessory. In another embodiment, the configuration for the accessory, including the rumble effects profiles for the various games, can be stored in the cloud 1025. In a further embodiment, the stored rumble effects profile is indexed according to the gaming accessory and the game with which the profile is associated (per-accessory and per-game storage).

Figure 14:
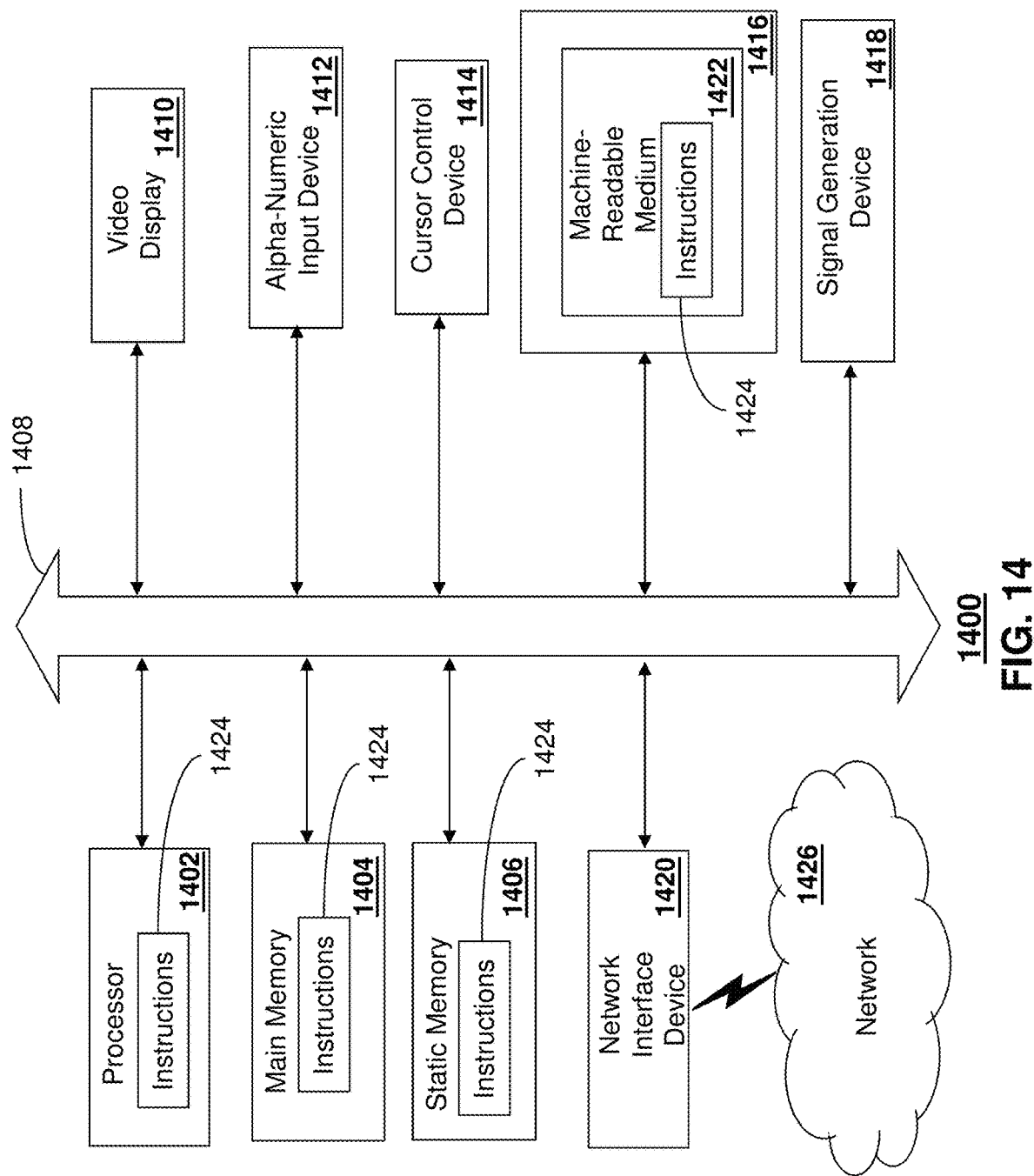
FIG. 14 depicts an illustrative diagrammatic representation of a machine in the form of a computer system within which a set of instructions, when executed, may cause the machine to perform any one or more of the methodologies disclosed herein.

FIG. 14 depicts an exemplary diagrammatic representation of a machine in the form of a computer system 1400 within which a set of instructions, when executed, may cause the machine to perform any one or more of the methods described above. One or more instances of the machine can operate, for example, as an accessory, computing device or combinations thereof. In some embodiments, the machine may be connected (e.g., using a network 1426) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1400 may include a processor (or controller) 1402 (e.g., a central processing unit (CPU)), a graphics processing unit (GPU, or both), a main memory 1404 and a static memory 1406, which communicate with each other via a bus 1408. The computer system 1400 may further include a display unit 1410 (e.g., a liquid crystal display (LCD), a flat panel, or a solid state display). The computer system 1400 may include an input device 1412 (e.g., a keyboard), a cursor control device 1414 (e.g., a mouse), a disk drive unit 1416, a signal generation device 1418 (e.g., a speaker or remote control) and a network interface device 1420. In distributed environments, the embodiments described in the subject disclosure can be adapted to utilize multiple display units 1410 controlled by two or more computer systems 1400. In this configuration, presentations described by the subject disclosure may in part be shown in a first of the display units 1410, while the remaining portion is presented in a second of the display units 1410.

The disk drive unit 1416 may include a tangible computer-readable storage medium 1422 on which is stored one or more sets of instructions (e.g., software 1424) embodying any one or more of the methods or functions described herein, including those methods illustrated above. The instructions 1424 may also reside, completely or at least partially, within the main memory 1404, the static memory 1406, and/or within the processor 1402 during execution thereof by the computer system 1400. The main memory 1404 and the processor 1402 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 1422 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 1400.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, can be used in the subject disclosure. In one or more embodiments, features that are positively recited can also be excluded from the embodiment with or without replacement by another component or step. The steps or functions described with respect to the exemplary processes or methods can be performed in any order. The steps or functions described with respect to the exemplary processes or methods can be performed alone or in combination with other steps or functions (from other embodiments or from other steps that have not been described).

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device comprising:
   a processing system including a processor; and
   a memory that stores instructions that, when executed by the processing system, facilitate performance of operations comprising:
   associating actuation of a control component of a gaming accessory with a time value, wherein the time value relates to a cooldown period of an action in a video game during which the action cannot be repeated after the action is performed, and wherein the cooldown period is a constraint imposed by the video game for the action;

initiating, based on detection of an actuation of the control component, a timer according to the time value; and generating, upon expiration of the timer, a tactile effect at the gaming accessory as an indication to a user of the gaming accessory that the cooldown period has elapsed.

2. The device of claim 1, wherein the tactile effect comprises a rumble effect.

3. The device of claim 1, wherein the generating the tactile effect comprises generating the tactile effect based on user selectable parameters.

4. The device of claim 3, wherein the user selectable parameters include a vibration frequency, a vibration intensity, or a combination thereof.

5. The device of claim 1, wherein the operations further comprise presenting a graphical user interface (GUI) for receiving user inputs to cause the associating of actuation of the control component of the gaming accessory with the time value.

6. The device of claim 5, wherein the GUI is generated by an accessory management software application executing on the device.

7. The device of claim 5, wherein the GUI presents a user selectable image of the gaming accessory.

8. The device of claim 1, wherein the operations further comprise detecting the actuation of the control component of the gaming accessory.

9. The device of claim 1, wherein the control component comprises a button.

10. The device of claim 1, wherein the operations further comprise storing a profile of a plurality of tactile effects for the gaming accessory, wherein the profile includes a plurality of control components of the gaming accessory, and wherein each control component of the plurality of control components is associated with a respective action of a plurality of actions in the video game and with a corresponding tactile effect of the plurality of tactile effects.

11. The device of claim 10, wherein the profile is indexed according to the gaming accessory and the video game.

12. A non-transitory machine-readable medium comprising instructions that, when executed by a processing system including a processor, facilitate performance of operations comprising:

associating actuation of a gaming accessory with a time value, wherein the time value is prescribed as a constraint by a video game and corresponds to a cooldown duration for which repetition of an action in the video game is prohibited after the action is performed;

initiating, based on detection of an actuation of the gaming accessory, a timer according to the time value; and generating, upon expiration of the timer, a rumble effect at the gaming accessory as an indication to a user that the cooldown duration, for which the action may not be repeated in the video game after the action is performed, has elapsed.

13. The non-transitory machine-readable medium of claim 12, wherein the operations further comprise presenting a graphical user interface (GUI) for receiving user inputs to cause the associating of actuation of the gaming accessory with the time value.

14. The non-transitory machine-readable medium of claim 13, wherein the GUI is generated by an accessory management software application executed by the processing system.

15. The non-transitory machine-readable medium of claim 13, wherein the GUI presents a user selectable image of the gaming accessory.

16. The non-transitory machine-readable medium of claim 12, wherein the operations further comprise detecting the actuation of the gaming accessory.

17. The non-transitory machine-readable medium of claim 12, wherein the rumble effect comprises a vibration effect.

18. A method comprising:

associating, by a processing system including a processor, actuation of a first control component of a gaming accessory with a first time value;

associating, by the processing system, actuation of a second control component of the gaming accessory with a second time value, wherein the first time value is prescribed by a video game as a first constraint and corresponds to a first cooldown period during which, after a first action is performed in the video game, repetition of the first action in the video game is prevented, and wherein the second time value is prescribed by the video game as a second constraint and corresponds to a second cooldown period during which, after a second action is performed in the video game, repetition of the second action in the video game is prevented;

initiating, by the processing system, and based on detection of an actuation of the first control component or the second control component, a timer according to the first time value or the second time value; and generating, by the processing system, and upon expiration of the timer, a tactile effect at the gaming accessory as an indication to a user of the gaming accessory that the first action or the second action may be repeated in the video game.

19. The method of claim 18, wherein the first control component comprises a first button of the gaming accessory, and wherein the second control component comprises a second button of the gaming accessory different from the first button.

20. The method of claim 18, wherein the first time value is different from the second time value.

* * * * *